(12) United States Patent
Marinero

(10) Patent No.: US 6,967,824 B2
(45) Date of Patent: Nov. 22, 2005

(54) HARD BIAS MAGNETIC STRUCTURE INCLUDING A CONDUCTIVE LAYER AND A TRANSITION LAYER AND A SEED LAYER

(75) Inventor: Ernesto E. Marinero, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 235 days.

(21) Appl. No.: 10/404,665

(22) Filed: Apr. 1, 2003

(65) Prior Publication Data
US 2004/0196597 A1 Oct. 7, 2004

(51) Int. Cl.[7] .............................................. G11B 5/39
(52) U.S. Cl. .............................................. 360/324.12
(58) Field of Search ........................ 360/324.1, 324.11, 360/324.12, 324.2, 327.3, 327.31

(56) References Cited

U.S. PATENT DOCUMENTS

| | | | |
|---|---|---|---|
| 5,664,316 A | 9/1997 | Chen et al. | 29/603.08 |
| 6,201,669 B1 | 3/2001 | Kakihara | 360/313 |
| 6,606,782 B2 * | 8/2003 | Min et al. | 29/603.15 |
| 2002/0015268 A1 | 2/2002 | Mao et al. | 360/324.12 |
| 2002/0135956 A1 * | 9/2002 | Hasegawa et al. | 360/324.12 |
| 2002/0181171 A1 * | 12/2002 | Chien et al. | 360/324.12 |
| 2002/0186516 A1 * | 12/2002 | Larson et al. | 360/324.12 |
| 2002/0191348 A1 * | 12/2002 | Hasegawa et al. | 360/314 |
| 2002/0191356 A1 * | 12/2002 | Hasegawa et al. | 360/324.11 |
| 2003/0030948 A1 * | 2/2003 | Umetsu | 360/324.12 |
| 2003/0058586 A1 * | 3/2003 | Pinarbasi et al. | 360/324.12 |
| 2004/0184200 A1 * | 9/2004 | Guo et al. | 360/324.12 |

* cited by examiner

Primary Examiner—Jefferson Evans
(74) Attorney, Agent, or Firm—John L. Rogitz

(57) ABSTRACT

A hard magnetic bias structure for a magnetic read head includes a seed layer made of CrMo, a hard bias magnet layer on top of the seed layer and made of CoPt, and a conducting layer below the seed layer. To lower the resistance of the structure while raising its magnetic coercivity, a first transition layer made of Ta and a second transition layer made of CoPt are disposed between the conducting layer and the seed layer.

40 Claims, 1 Drawing Sheet

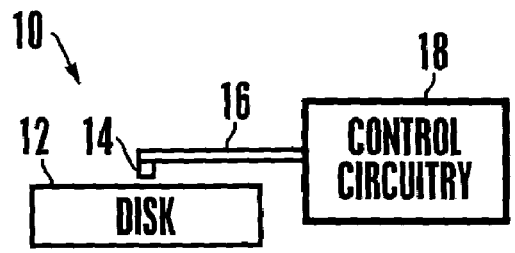
Figure 1
Figure 2
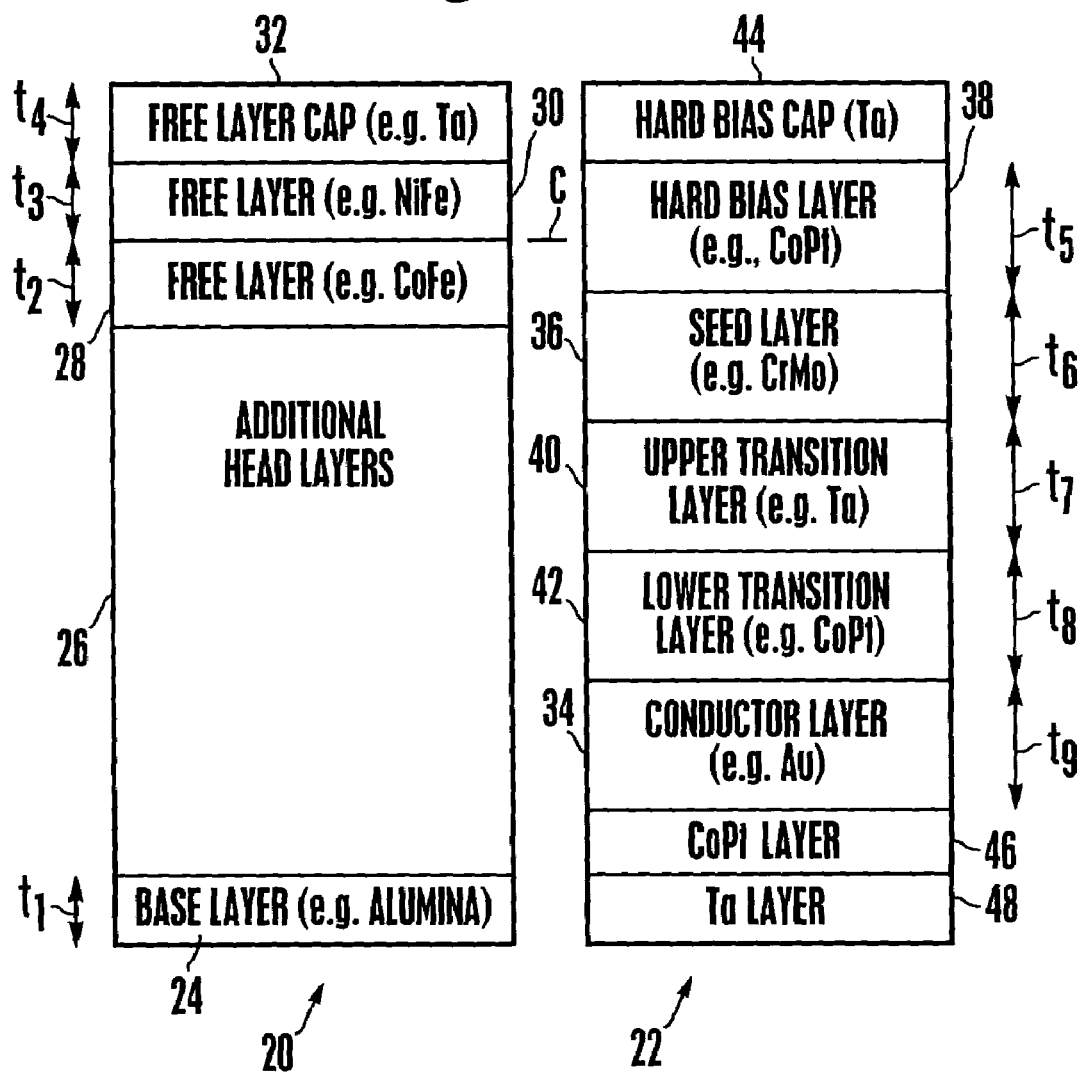

HARD BIAS MAGNETIC STRUCTURE INCLUDING A CONDUCTIVE LAYER AND A TRANSITION LAYER AND A SEED LAYER

FIELD OF THE INVENTION

The present invention relates generally to magnetic read heads.

BACKGROUND OF THE INVENTION

Magnetic read heads are used in hard disk drives to sense magnetic signals from disks spinning beneath the read heads and, thus, to read data on the disks. To control the stability and magnetic moment orientation of the sensor layer of the head, a bias field is provided by hard bias magnet layers that are disposed next to the sensor layer at its two side edges.

As understood herein, a so-called "ultra contiguous junction" (UCJ) arrangement may be used to achieve a collinear relationship between the center of the hard bias layers and the center of the free sensor layer and thus avoid geometries that can lead to magnetic instabilities. Eliminating these instabilities can facilitate the read head reading higher density data recording, thus permitting a disk drive to store more data than it would otherwise be able to store.

The collinear relationship mentioned above is achieved by disposing a seed layer below the hard bias magnet layer to raise the hard bias magnet layer to the desired height vis-a-vis the nearby free sensor layer. However, as recognized herein, the presence of the seed layer can undesirably increase the electrical resistivity of the hard bias magnet stack. To counter this, the seed layer can be grown on a conducting layer such as gold (Au), but this in turn can undesirably reduce the magnetic coercivity of the stack, thereby frustrating the purpose of the hard bias stack in the first place. The decrease in coercivity is believed to be attributable to the loss of crystallographic orientation in the hard bias layer, which in turn is due to the lack of a desired crystal orientation developing in the seed layer when it is grown on gold or other body centered cubic (bcc) metals. Having recognized these considerations, the invention disclosed herein is provided.

SUMMARY OF THE INVENTION

A hard magnetic bias structure for a magnetic read head includes a seed layer made of, e.g., $Cr_xMo_{1-x}$, a conducting layer made of, e.g., gold, and a hard bias magnet layer made of, e.g., $Co_yPt_{1-y}$. In preferred embodiments, "x" may be between 0.1 and 0.3 inclusive and "y" may be between 0.25 and 0.90 inclusive. The seed layer is disposed between the hard bias magnet layer and the conducting layer. At least one transition layer is between the conducting layer and the seed layer. The transition layer reduces the electrical resistance of the structure and increases the magnetic coercivity of the structure compared to a substantially identical structure but without the transition layer.

Preferably, first and second transition layers are provided between the seed layer and the conducting layer. The first transition layer may be made of Tantalum (Ta) and the second transition layer may be made of $Co_yPt_{1-y}$ or Co, wherein "y" ranges from 0.25 to 1. That is, the second transition layer may be made of from 25% to about 100% Co. The first (Ta) transition later may be between the second transition layer and the seed layer. The transition layers may be no more than three nanometers (3 nm) thick, and preferably can be 0.5 nm thick. In any case, the preferred second transition layer defines a thickness that is sufficient to render the second transition layer superparamagnetic.

If desired, at least one underlayer may be disposed such that the conducting layer is between the underlayer and the transition layer. First and second underlayers can be provided, with the first underlayer being made of CoPt or Co and the second underlayer being made of Ta.

In another aspect, a method for making a hard bias structure for a read head includes providing a seed layer, a hard bias magnet layer, and a buried conductor beneath the seed layer and hard bias magnet layer. The method also includes providing at least one transition layer between the conductor and the seed layer.

In still another aspect, a data storage device includes a data-bearing medium and a magnetic read head juxtaposed with the data-bearing medium. The read head includes a sensor stack and a hard bias stack that in turn includes a buried conductor under a seed layer and a hard bias magnet layer. Also, at least one transition layer is interposed between the conductor and at least one of: the seed layer, and the hard bias magnet layer.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic block diagram of a magnetic read head in a hard disk drive apparatus; and FIG. 2 is a schematic side view of the junction between one end of the sensing layer and the hard bias structure.

DETAILED DESCRIPTION OF THE PREFERRED EMBODIMENT

Referring initially to FIG. 1, a storage device 10 is shown that includes a data bearing medium such as one or more magnetic disks 12 and at least one magnetic read head 14 positioned for sensing signals (and, thus, for reading data) from the disk 12. The read head 14 may be positioned on an arm 16 that is controlled by circuitry 18 in accordance with principles known in the art.

The details of the present MR head-related invention can be seen in FIG. 2, which sets forth presently preferred materials using standard element abbreviations. As shown, the MR head 14 can include at least one sensing stack 20 and a hard bias magnet stack 22 disposed next to the sensing stack 20 to provide a bias field to control the sensor layer magnetic moment orientation and its magnetic stability. It is understood that while for ease in explanation only one hard bias magnet stack is shown (on the right side junction with the sensing stack 20), in magnetic read sensors there is a second hard bias stack located on the left side junction with the sensing stack 20. The sensing stack 20 may include a base layer 24 made of alumina on top of which are one or more additional head layers 26, as is well known in the art of spin-valve magnetic read heads. These additional head layers typically include the pinned ferromagnetic layer, an antiferromagnetic layer for pinning the magnetic moment of the pinned layer, and the spacer layer, typically copper, located between the pinned ferromagnetic layer and the free or sensing ferromagnetic layer. In the absence of an applied magnetic field, the free ferromagnetic layer has its magnetic moment oriented in a preferred direction, and the hard bias magnetic structures bias this moment in this preferred direction. In the presence of an applied magnetic field in the range of interest, such as the magnetic fields from data recorded in the magnetic layer of the disk, the free layer's magnetic moment is free to rotate relative to the fixed magnetic moment of the pinned ferromagnetic layer.

As shown in FIG. 2, the free or sensing layer is shown as a bilayer structure, although it is well known that the free layer may be a single layer of ferromagnetic material. In the bilayer structure shown, first free sensing layer 28 may be on top of the head layers 26, and a second free layer 30 may be on top of the first free layer 28. The first free layer 28 may be made of a cobalt iron (CoFe) alloy while the second free layer 30 may be made of a nickel iron (NiFe) alloy. A free layer cap 32 that can be made of Tantalum (Ta) can be on top of the second free layer 30. The invention thus applies to spin valve applications where the sense current is in the plane of the pinned and sensing ferromagnetic layers, as well as to other magnetic disk read head applications including those wherein the sense current is perpendicular to the plane (CPP) of the layers, such as CPP giant magnetoresistive (GMR) sensors and magnetic tunnel junction (MTJ) read heads.

Turning now to the details of the preferred hard bias magnet stack 22, a buried conductor layer 34 can underlie a seed layer 36, on top of which is disposed a hard bias magnet layer 38. As intended herein, the hard bias magnet layer 38 of the hard bias stack 22 shares a common centerline C (in the thickness dimension) with the free layers 28, 30 of the sensing stack 20.

In accordance with the present invention, interposed between the conductor layer 34 and the seed layer 36 are one or more transition layers. In the embodiment shown, an upper transition layer 40 is below the seed layer 36, and a lower transition layer 42 is between the upper transition layer 40 and the conductor layer 34.

As recognized by the present invention, the transition layers reduce the electrical resistance of the hard bias stack 22 and increase the magnetic coercivity of the stack 22 compared to a substantially identical stack but without the transition layers. The transition layers facilitate the seed layer 36 developing a desired growth orientation.

In the embodiment shown, the hard bias layer 38 can be made of $Co_yPt_{1-y}$, wherein y denotes the percentage of Cobalt that makes up the alloy. The hard bias layer 38 can have a thickness t5 of 7.8 nm, and in one preferred embodiment is made of $Co_{75}Pt_{25}$. More generally, "y" can range from between 0.25 to 0.90 inclusive. In contrast, the seed layer 36 can be made of $Cr_xMo_{1-x}$, wherein "x" denotes the percentage of Chromium in the alloy and can range from 0.1 to 0.3 inclusive. The thickness t6 of the seed layer 36 can be 4 nm. Alternatively, the seed layer can be made of other body centered cubic (bcc) metals such (200) oriented bcc metals whose C-axis lattice mismatch is in the range 0%–3% such as, e.g., Cr, $Cr_xTi_{1-x}$, $Cr_xMn_{1-x}$, and $Cr_xV_{1-x}$.

In the preferred embodiment, the upper transition layer 40 is made of Tantalum having a thickness t7 of 0.5 nm, whereas the lower transition layer 42 is made of $Co_zPt_{1-z}$ having a thickness t8 of 0.5 nm, wherein "z" can range from almost one (1) to 0.25, inclusive. That is, the lower transition layer can be made of pure Cobalt if desired. In general, the transition layers each of a thickness of no more than 3 nm. The thickness t8 of the preferred lower transition layer 42 is sufficient to render the lower transition layer 42 superparamagnetic.

The conductor layer can be made of one or more of Au, Rh, W, and Cu, and can have a thickness t9 of 6.5 nm. If desired, a hard bias stack cap 44 made of, e.g., Tantalum and having a thickness of, e.g., 2 nm can overlay the hard bias magnet layer 38, while two underlayers 46, 48 can be below the conductor layer 34. The upper underlayer 46 can be made of 0.5 nm thick CoPt or pure Co, and the lower underlayer 48 can be made of 1.0 nm thick Tantalum. When the conductor layer 34 is a layer of <10 nm thick gold, its conductivity can be optimized by growing it on a CoPt underlayer, which improves the coalescence of the gold. The lower underlayer 48 of Tantalum may be used as an adhesion layer for the gold, and may not be required when the upper underlayer 46 of CoPt is used.

While the particular MAGNETIC READ HEAD WITH HARD BIAS MAGNET STRUCTURE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard magnetic bias structure for a magnetic read head, comprising:
    at least one seed layer, the seed layer including $Cr_xMo_{1-x}$;
    at least one conducting layer;
    at least one hard bias magnet layer, the hard bias magnet layer including $Co_yPt_{1-y}$, the seed layer being disposed between the hard bias magnet layer and the conducting layer; and
    at least one transition layer between the conducting layer and the seed layer.

2. The structure of claim 1, wherein the transition layer reduces the electrical resistance of the structure and increases the magnetic coercivity of the structure compared to a substantially identical structure but without the transition layer.

3. The structure of claim 1, wherein x is between 0.1 and 0.3 inclusive.

4. The structure of claim 1, wherein y is between 0.25 and 0.90 inclusive.

5. The structure of claim 1, wherein x is between about 0.1 and about 0.3 inclusive.

6. The structure of claim 1, wherein y is between about 0.25 and about 0.90 inclusive.

7. The structure of claim 1, wherein the conducting layer is made of at least one of: Au, Rh, W, and Cu.

8. The structure of claim 1, wherein the transition layer is made of at least one of: Ta, CoPt, Co.

9. The structure of claim 1, comprising first and second transition layers between the seed layer and the conducting layer, the first transition layer being made of Ta and the second transition layer being made of CoPt or Co.

10. The structure of claim 9, wherein the first transition later is between the second transition layer and the seed layer.

11. The structure of claim 9, wherein the second transition layer is made of from 25% to about 100% Co.

12. The structure of claim 9, wherein the first transition layer defines a thickness of no more than three nanometers (3 nm).

13. The structure of claim 9, wherein the second transition layer defines a thickness sufficient to render the second transition layer superparamagnetic.

14. The structure of claim 1, further comprising at least one underlayer disposed such that the conducting layer is between the underlayer and the transition layer.

15. The structure of claim 14, further comprising first and second underlayers, at least the first underlayer being made of CoPt or Co and the second underlayer being made of Ta.

16. The structure of claim 1, in combination with at least one read head free sensor structure.

17. A method for making a hard bias structure for a read head, comprising:
providing at least one seed layer;
providing at least one hard bias magnet layer;
providing at least one buried conductor beneath the seed layer and hard bias magnet layer; and
providing at least one transition layer between the conductor and the seed layer, wherein the seed layer includes at least one body centered cubic (bcc) (200) oriented metal whose C-axis lattice mismatch is in the range of 0%–3% inclusive.

18. The method of claim 17, wherein the transition layer facilitates the seed layer developing a desired growth orientation.

19. The method of claim 18, wherein the transition layer reduces the electrical resistance of the hard bias structure and increases the magnetic coercivity of the hard bias structure compared to a substantially identical structure but without the transition layer.

20. The method of claim 17, wherein the seed layer is made of at least one of: $Cr_xMo_{1-x}$, Cr, $Cr_xTi_{1-x}$, $Cr_xMn_{1-x}$, and $Cr_xV_{1-x}$.

21. The method of claim 17, wherein the hard bias magnet layer includes $Co_yPt_{1-y}$, wherein y is between 0.25 and 0.90 inclusive.

22. The method of claim 17, wherein the buried conductor is made of at least one of: Au, Rh, W, and Cu.

23. The method of claim 17, wherein the transition layer is made of at least one of: Ta, CoPt and Co.

24. The method of claim 17, comprising disposing the structure adjacent at least one read head free sensor structure.

25. A method for making a hard bias structure for a read head, comprising:
providing at least one seed layer;
providing at least one hard bias magnet layer;
providing at least one buried conductor beneath the seed layer and hard bias magnet layer;
providing a least first and second transition layers between the seed layer and the buried conductor, the first transition layer being made of Ta and the second transition layer being made of CoPt or Co.

26. The method of claim 25, wherein the first transition later is between the second transition layer and the seed layer.

27. The method of claim 25, wherein the second transition layer is made of from 25% to about 100% Co.

28. The method of claim 25, wherein the first transition layer defines a thickness of no more than three nanometers (3 nm) and the second transition layer defines a thickness sufficient to render the second transition layer superparamagnetic.

29. A method for making a hard bias structure for a read head, comprising:
providing at least one seed layer:
providing at least one hard bias magnet layer:
providing at least one buried conductor beneath the seed layer and hard bias magnet layer:
providing at least one transition layer between the conductor and the seed layer, at least one underlayer disposed such that the buried conductor is between the underlayer and the transition layer.

30. The method of claim 29, further comprising first and second underlayers, at least the first underlayer being made of CoPt or Co and the second underlayer being made of Ta.

31. A magnetic read head comprising:
a sensor stack comprising a pinned ferromagnetic layer having its magnetic moment substantially prevented from rotating in the presence of an applied magnetic field in the range of interest, a free ferromagnetic layer having its magnetic moment oriented in a preferred direction in the absence of an applied magnetic field and substantially free to rotate in the presence of an applied magnetic field in the range of interest, and a spacer layer located between the pinned and free ferromagnetic layers; and
a hard bias stack located at each of the ends of the free ferromagnetic layer, each hard bias stack including at least one buried conductor at least one seed layer and at least one hard bias magnet layer, at least one transition layer being interposed between the conductor and at least one of: the seed layer, and the hard bias magnet layer, the hard bias layer providing biasing of the magnetic moment of the free layer in said preferred direction, and
at least one underlayer disposed such that the buried conductor is between the underlayer and the transition layer.

32. The head of claim 31, wherein the transition layer facilitates the seed layer developing a desired growth orientation, reduces the electrical resistance of the hard bias stack, and increases the magnetic coercivity of the hard bias stack, compares to a substantially identical structure but without the transition layer.

33. The head of claim 31, wherein the hard bias magnet layer includes $Co_yPt_{1-y}$, wherein y is between 0.25 and 0.90 inclusive, and the buried conductor is made of at least one of: Au, Rh, W, and Cu.

34. The head of claim 31, wherein the transition layer is made of at least one of: Ta, CoPt, Co.

35. The head of claim 31, further comprising first and second underlayers, at least the first underlayer being made of CoPt or Co and the second underlayer being made of Ta.

36. A magnetic read head comprising:
a sensor stack comprising a pinned ferromagnetic layer having its magnetic moment substantially prevented from rotating in the presence of an applied magnetic field in the range of interest, a free ferromagnetic layer having its magnetic moment oriented in a preferred direction in the absence of an applied magnetic field and substantially free to rotate in the presence of an applied magnetic field in the range of interest, and a spacer layer located between the pinned and free ferromagnetic layers; and a hard bias stack located at each of the ends of the free ferromagnetic layer, each hard bias stack including at least one buried conductor under at least one seed layer and at least one hard bias magnet layer, at least first and second transition layers being interposed between the conductor and at least one of: the seed layer, and the hard bias magnet layer, the hard bias layer providing biasing of the magnetic moment of the free layer in said preferred direction, the first transition layer being made of Ta and the second transition layer being made of CoPt or Co.

37. The head of claim 36, wherein the first transition later is between the second transition layer and the seed layer.

38. The head of claim 36, wherein the first transition layer defines a thickness of no more than three nanometers (3 nm) and the second transition layer defines a thickness sufficient to render the second transition layer superparamagnetic.

39. A magnetic read head comprising:

a sensor stack comprising a pinned ferromagnetic layer having its magnetic moment substantially prevented from rotating in the presence of an applied magnetic field in the range of interest, a free ferromagnetic layer having its magnetic moment oriented in a preferred direction in the absence of an applied magnets field and substantially free to rotate in the presence of an applied magnetic field in the range of interest, and a spacer layer located between the pinned and free ferromagnetic layers; and a hard bias stack located at each ends of the free ferromagnetic layer, each hard bias stack including at least one buried conductor under the least one seed layer and at least one hard biasmagnet layer, at least one transition layer being interposed between the conductor and at least one of: the seed layer, and the hard bias magnet layer, the hard bias layer providing biasing of the magnetic moment of the free layer in said preferred direction, wherein the seed layer includes at least one body centered cubic (bcc) (200) oriented metal whose C-axis lattice mismatch is in the range of 0%–3% inclusive.

40. The head of claim 39, wherein the seed layer is made of at least one of: $Cr_xMo_{1-x}$, $Cr$, $Cr_xTi_{1-x}$, $Cr_xMn_{1-x}$, and $Cr_xV_{1-x}$.

* * * * *